United States Patent [19]

Eastman et al.

[11] Patent Number: 4,465,702

[45] Date of Patent: Aug. 14, 1984

[54] COLD-WATER-SOLUBLE GRANULAR STARCH FOR GELLED FOOD COMPOSITIONS

[75] Inventors: James E. Eastman, Decatur; Carl O. Moore, Rochester, both of Ill.

[73] Assignee: A. E. Staley Manufacturing Company, Decatur, Ill.

[21] Appl. No.: 438,088

[22] Filed: Nov. 1, 1982

[51] Int. Cl.$^3$ .................... A23L 1/195; A23L 1/187
[52] U.S. Cl. .................... 426/578; 426/579; 426/661; 127/32; 127/71; 127/33; 260/412.4; 260/412.8
[58] Field of Search .................... 426/578, 579, 661; 127/32, 71, 33; 260/412.4, 412.8

[56] References Cited

U.S. PATENT DOCUMENTS

| 847,658 | 3/1907 | Drittler. | |
|---|---|---|---|
| 1,956,064 | 4/1934 | Edson | 87/17 |
| 2,121,502 | 6/1938 | Kesler | 127/33 |
| 2,124,372 | 7/1938 | Kesler | 127/33 |
| 2,516,634 | 7/1950 | Kesler et al. | 260/209 |
| 3,067,064 | 12/1962 | Carey | 127/32 |
| 3,332,785 | 7/1967 | Kuchinke et al. | 99/139 |
| 3,399,081 | 8/1968 | Bernetti et al. | 127/71 |
| 3,583,874 | 6/1971 | Germino et al. | 99/139 |
| 3,586,536 | 6/1971 | Germino et al. | 127/32 |
| 3,617,383 | 11/1971 | Thurston et al. | 127/31 |
| 3,717,475 | 2/1978 | Germino et al. | 99/134 |
| 4,104,212 | 8/1978 | Bruner | 260/17.3 |
| 4,207,355 | 6/1980 | Chiu et al. | 426/578 |
| 4,228,199 | 10/1980 | Chiu et al. | 426/578 |
| 4,229,489 | 10/1980 | Chiu et al. | 426/578 |
| 4,260,642 | 4/1981 | Mitchell et al. | 426/579 |

OTHER PUBLICATIONS

Whistler et al., *Starch: Chemistry and Technology*, vol. II, (1967), pp. 253–278, "Production and Use of Starch Dextrins".

*Primary Examiner*—Jeanette M. Hunter
*Attorney, Agent, or Firm*—Forrest L. Collins; Philip L. Bateman; Steven R. Lammert

[57] ABSTRACT

A cold-water-swelling granular starch material derived from ungelatinized corn starch and characterized by a cold-water solubility of at least 50% is prepared by subjecting granular corn starch, slurried in selected aqueous alcohols, to conditions of high temperature and pressure. The cold-water-swelling granular starch material derived from chemically unmodified (or minimally modified) ungelatinized corn starch has an ability to set to a sliceable gel without cooking or chilling when blended with an aqueous sugar syrup. That granular starch material is particularly useful in food systems of the type which set or gel upon standing such as pie fillings, jellies, demouldable desserts and puddings.

29 Claims, No Drawings

COLD-WATER-SOLUBLE GRANULAR STARCH FOR GELLED FOOD COMPOSITIONS

BACKGROUND AND SUMMARY OF THE INVENTION

The present invention relates to a cold-water-swelling granular starch which is characterized by a high cold-water solubility and to a process for its preparation. The present invention also relates to the use of the novel starch material as a gelling or thickening agent in food systems, particularly those of the type which set or gel on standing.

Most common of the food systems which have a set or a gel texture are dessert formulations such as pie fillings, puddings and jellies. Many food systems of this description contain a starch gelling agent which must be cooked in the formulation to effect gelation. An example of a such food product which requires cooking to effect gelation is the conventional starch-based pudding, which generally consists of ungelatinized starch, flavorings, sweetening agents, coloring material and other food acceptable adjuvants such as emulsifiers. Such puddings are prepared for consumption by adding milk, cooking until the starch is gelatinized, pouring the cooked mixture into a bowl or individual serving dishes, and cooling and/or refrigerating. The starch used in such cooked food formulations can be common food grade ungelatinized corn starch or starches derived from potato, tapioca, and wheat which will when acid-converted to certain water fluidity levels, retrograde to a gel when cooked. Other common gelling agents used in the past for cooked food compositions include agar, gelatin, pectin, carrageenin, algin, and combinations of locust bean gum and xanthan gum.

To avoid the inconvenience associated with food systems requiring cooking and subsequent chilling to achieve the desired gel structure, there has been developed and described in the art a number of gelling or setting agents and combinations thereof which will effect gelling of a food composition without cooking. Most food systems utilizing such no-cook gelling agents are milk-based and consist of chemically modified pregelatinized starch, one or more setting agents, which are usually phosphate salts, and flavoring, sweetening, and coloring agents. The set or gel properties of these food systems are obtained from the interaction from the phosphate salts with the casein and calcium ions provided by the milk, and not from the starch ingredient in the formulation. In such systems the pregelatinized starch functions as a viscosity builder or thickening agent, but does not play a primary role in the development of the gel structure of the prepared food system.

One major drawback of many of these uncooked or instant food formulations is that they do not have the firm gel structure such as that obtainable in the cooked formulations; that is, they do not cut as cleanly with a spoon, and their texture rather than being smooth, is generally described as "grainy" in both appearance and mouth-feel. Moreover, setting salt gelling combinations are not operative at low pH or in non-milk-based food systems.

The development of a no-cook or instant gelling food composition which has properties such as texture, appearance, gel structure and flavor which closely resemble those of comparable food formulations which are cooked has been the goal of a number of research and development efforts in the starch and food industry.

Most success in the development of no-cook, starch-based gelling compositions has been found with chemically modified, pregelatinized starches (particularly those derived from potato and tapioca) and combinations of pregelatinized starch with other starch-based ingredients.

Germino, U.S. Pat. No. 3,583,874 discloses a starch composition suitable as a gelling agent in instant puddings which comprises a blend of pregelatinized, defatted starch and a granular preswollen starch having a water fluidity in a certain range.

Kuchinke, U.S. Pat. No. 3,332,785 describes a cold setting pregelatinized starch material which is prepared by heating starch in an aqueous slurry with an organic carboxylic acid to 90° to 95° C. until the starch is completely gelatinized and thereafter spray drying the mixture.

Chiu, U.S. Pat. No. 4,228,199 describes a chemically modified, pregelatinized, cold-water dispersible gelling potato starch which is useful in preparing instant gelling food compositions. The modified potato starch is prepared by reacting a potato starch with a cross-linking agent to within defined Brabender Viscosity limits sufficient to provide the modified starch with gelling properties and thereafter drum drying the cross-linked starch to obtain the modified gelling potato starch product. Chiu, U.S. Pat. Nos. 4,229,489 and 4,207,355 each describe cold-water dispersible, gelling, chemically modified tapioca starch. The preparation of each of the disclosed gelling tapioca starches involves converting a tapioca starch to a specified water fluidity and reacting the starch with a cross-linking agent to within defined Brabender Viscosity limits. The modified tapioca starch described in the '489 patent is prepared by first reacting tapioca starch with cross-linking agent, acid converting the cross-linked starch and then drum drying the cross-linked and converted starch to provide a chemically modified, pregelatinized starch material with gelling properties.

In addition to the chemically modified, pregelatinized starches which have been developed for instant gelling food systems, there is also disclosed in Mitchell, U.S. Pat. No. 4,260,642 the preparation of instant pudding starches through modification of a starch by forming an aqueous slurry containing an ungelatinized starch and an effective amount of sodium or calcium stearoyl-2-lactylate and heating the slurry to a temperature and for a period of time sufficient to gelatinize the starch. That patent discloses that the resultant modified starch possesses a smoother, creamier mouth-feel and higher sheen than does a starch pregelatinized without sodium or calcium stearoyl-2-lactylate. In one preferred embodiment of that invention, an aqueous slurry of ungelatinized starch is heated in the presence of calcium or sodium stearoyl-2-lactylate for a period of time sufficient to gelatinize the starch and to obtain whole granules uniformly swelled while minimizing bursting and undercooking of the starch granules and drying the slurry.

In view of recent trends and preference for the use of "natural" (not chemically modified) ingredients in food preparations, a starch preparation which is unmodified by reaction with chemical modifiers or one which has been subjected to only a minimal amount of chemical modification or derivatization would offer several obvious advantages for use in gelled food systems. Not only would the cost of chemical modifying agents be eliminated or minimized but also there would be the inherent advantage perceived by the consumer of minimizing or eliminating the chemically modified starch ingredients in the many gelled or starch thickened food compositions which are included in the consumer's diet.

Accordingly, it is an object to the present invention to provide a granular starch material, having little or no chemical substitution or modification which is useful as a thickening or gelling agent for instant food formulations.

It is a further object of this invention to provide an instant gelling food composition which has the texture, appearance, gel structure and flavor which resemble those of comparable starch-based cooked food formulations.

Another object is to provide a process for converting ungelatinized granular corn starch having little or no cold-water solubility to a granular starch product which has a cold-water solubility of at least 50% and is useful as a thickening agent in no-cook food formulations.

Still another object is to provide a process for the preparation of starch gelling agents suitable for use in instant gelled food formulations which does not involve the modification of starch by reaction with chemical modifiers.

A further object of this invention is to provide a unique cold-gelling granular starch material, not modified chemically, but having a cold-water solubility of at least 50%.

It is still another object of the present invention to provide instant gelled food compositions having the texture, appearance and flavor of cooked starch-containing gelled food formulations by utilizing as the gelling agent a granular starch material which has not been chemically modified by reaction with chemical reactants.

The above and related objects are achieved in the present invention by a novel cold-water-swelling granular starch material derived from ungelatinized corn starch. The improved cold-water-swelling granular starch material consists essentially of substantially intact, partially swollen granules which appear nonbirefringent when viewed under a polarizing microscope. It is further characterized by a cold-water solubility of at least 50% and, where the ungelatinized corn starch starting material for the present starch is not modified chemically or minimally modified, by an ability to set, without cooking or chilling, to a resilient, cleanly sliceable gel when blended with an aqueous sugar syrup. The present cold-water-swelling/cold-water-soluble starch material is prepared by forming a slurry of granular ungelatinized corn starch in a liquid medium comprised of water and either ethanol, denatured ethanol, propanol or isopropanol; and heating said slurry to a temperature of about 300° to about 360° F. at or above autogenic pressure for about 1 to about 30 minutes. The cold-water-swelling granular starch material is then separated from the processing medium by filtration, centrifugation, decantation and like means.

Cold-water-swelling granular starches, that is, granular starches which, when added to cold water, will rapidly swell and disperse into water to form a smooth viscous paste, are not unknown in the art. Generally, cold-water-swelling granular starch products have been prepared either by chemical modification, especially hydroxyalkylation such as that described in Kisler, U.S. Pat. No. 2,516,634, or by so-called physical modification wherein granular starch is not modified chemically by reaction with starch-reactive chemical modifiers, but instead is subjected to conditions which cause the individual granules to swell to the extent that they lose birefringence but not to the extent that the granules burst. Typical of the conditions for such "physical modification" of granular starch is heating starch above the granular swelling temperature in the presence of water and gelatinization inhibitors or in the presence of amounts of water (or other liquids capable of gelatinizing starch) insufficient to effect gelatinization (granular disintegration).

The process for preparing the present cold-water-swelling granular starch material can be characterized as a physical modification procedure. There are a number of prior art patents which disclose cold-water-swelling granular starch products prepared by processes embodying apparent physical modifications of granular starch, or apparent combinations of physical and chemical modifications of granular starch.

Drittler, U.S. Pat. No. 847,658 describes a granular cold-water-swelling starch material which is prepared by mixing dry powdered commercial starch with a suitable quantity of a liquid hydrocarbon or hydrocarbons and then adding a suitable quantity of caustic alkali. The granular starch product thereby produced swells in cold water to form a viscous paste-like mass. Edson U.S. Pat. No. 1,956,064 describes the preparation of a dextrinized cold-water-swelling granular starch by heating granular starch to 400° F. in an oven. The product is dispersed in cold water by stirring to provide starch pastes which are useful as adhesives and apparently do not set to a gel on standing.

Kesler, U.S. Pat. Nos. 2,121,502 and 2,124,372 each describe and claim methods for preparing nonbirefringent granular starch products comprising heating raw starch in water in the presence of a disintegration inhibitor to a temperature sufficient to swell the granules to an extent that they lose birefringence but before the bulk of said granules have disintegrated. The '372 patent discloses the use of surfactant type compounds as disintegration inhibitors while the '502 patent discloses the use of volatile inhibitors such as hydrogenated phenols. The swollen granular products in each case are disclosed as useful in the manufacture of paper and are said to remain suspended (in water) at concentrations at which ordinary starch would settle out. There is no disclosure of the high water-solubility characteristic of the starches of the present invention.

Carey, U.S. Pat. No. 3,067,064 discloses the preparation of a thin-boiling, free-flowing starch material characterized by swollen cells and unbroken cell walls which product is prepared by tempering granular starch material at a temperature below its gelatinization temperature to a moisture content of 27 to 42% and thereafter heating the starch material in the semi-dry state in the presence of live steam until the cells in the starch material are swollen and unruptured, that is until the granules lose birefringence, as measured by the so-called maltese-cross test. The patent discloses that on boiling a 10% suspension of the described starch material, it did not thicken appreciably nor did it form a gel on cooling.

Bernetti, U.S. Pat. No. 3,399,081 describes the preparation of nonbirefringent granular starches which exhibit cold paste viscosities on initial dispersion in cold water by treating granular starch with mixtures of ammonia and methanol at low temperature. By use of a high concentration of ammonia and an excess of methanol, it is disclosed that a product is produced that has a swelling power at 25° C. of 17, solubles value of 36% and a fat content of 0.4%. The starch products are described as useful laundry starches.

Thurston, U.S. Pat. No. 3,617,383 describes and claims a continuous process for preparing a cold-water-swelling granular starch having 40 to 100% loss of birefringence by (1) preparing a slurry of a granular ungelatinized starch material in a mixture of a solvent for starch, including water, and an organic liquid which is miscible with the solvent for the starch material and which is not itself a solvent for the starch material, said miscible organic liquid including lower alcohols; and (2) passing that slurry through a heated confined zone. A preferred processing medium for the disclosed process is a mixture of water and methanol. The '383 patent does not disclose granular cold-water-swelling starch products having the high water solubility and gelling properties characteristic of the chemically unmodified cold-water-swelling starches of the present invention, nor does it exemplify process conditions capable of producing the present starch material.

Germino, U.S. Pat. Nos. 3,717,475 and 3,586,536 describe a continuous fat extraction process wherein granular starches having a normal amount of bound fat are first mixed with a solvent for said bound fat, the resultant mixture containing not more than 15% of water based on the weight of the total mixture and thereafter heating the mixture in a confined zone at a temperature of about 225° to 300° F. for a time sufficient to reduce the bound fat content of the starch to not more than 0.15%. One goal of the disclosed process is to provide defatted starches having no incipient gelatinization. Incipient gelatinization is said to exist if more than 2% of the granules showed anything from a swelling of the hilums of the granules to a complete loss of birefringence. Several examples in that patent describe the heating of converted thin-boiling granular starch in mixtures of lower alcohols and water to provide granular starch products which are outside the scope of the claimed invention because they were said to have incipient gelatinization. Applicants have found that the conditions of those examples, even when applied to unconverted granular starch, do not provide starch products having the water-solubility characteristics of the cold-water-swelling granular starch products of the present invention; indeed, ethanol and isopropanol are taught as inoperative in the process disclosed therein.

Bruner, U.S. Pat. No. 4,104,212 describes the preparation of granular cold-water-swelling starches which are useful as thickeners for latex compositions. The cold-water-swelling starch is prepared by heating granular starch in an aqueous slurry to about 167° F. for 30 seconds followed by spray drying. A 10% aqueous slurry of the described starch products is said to exhibit a Brookfield Viscosity of 150 to 650 centipoise. A 10% aqueous slurry of a cold-water-swelling granular starch of the present invention exhibited a Brookfield Viscosity of 44,500 centipoise.

Mitchell, U.S. Pat. No. 4,260,642 discussed hereinabove describes a process for preparing a pregelatinized modified starch suitable for use in instant puddings by forming an aqueous slurry containing an ungelatinized starch and an effective amount of sodium stearoyl-2-lactylate and heating the slurry to a temperature for a period of time sufficient to gelatinize the starch and to obtain whole starch granules uniformly swelled while minimizing bursting and undercooking of starch granules. The modified starch material according to the '642 patent does not exhibit the cold-water solubility of the present granular starch.

The cold-water-swelling granular starch material of applicants' invention is distinguished from the cold-water-swelling granular starch materials disclosed in the prior art by its unusual high water-solubility (compared to other granular starches which have not been modified chemically, such as by hydroxypropylation, with the purpose of imparting that characteristic).

In addition, the starch materials prepared in accordance with the present process from ungelatinized corn starch having little or no prior chemical modification have the unique ability (as a granular starch material) to set without cooking or chilling to a resilient, cleanly sliceable gel when blended with an aqueous sugar syrup. Heretofore, gelling characteristics resembling those exhibited by such of the present granular starch materials have been seen only in chemically modified, pregelatinized starches. "Pregelatinized" as used herein (and commonly in the art) with reference to prior art starch materials refers to starch materials in which little if any of the starch is in granular form; the granules therein have been substantially fragmented, burst, or disintegrated by processing.

The cold-water-swelling, cold-gelling starch material of the present invention is useful in any food formulation where a starch which will gel without further cooking is desired, and is particularly suited for use in pie and cream fillings, puddings, spreads, jellies, and instant mixes of the type which are reconstituted with water or milk and allowed to set at room temperature or lower. The present starch materials also can be used alone or in combinations with other starch materials as a thickening agent for other food compositions commonly containing a starch thickening agent including, for example, sauces and gravies. An instant food system containing the present starch will have a texture, appearance, and flavor which closely resembles that of a starch-thickened or gelled food formulation which has been cooked.

DETAILED DESCRIPTION OF THE INVENTION

The cold-water-swelling granular starch material of the present invention is derived from ungelatinized corn starch. The present granular starch material consists essentially of substantially intact, partially swollen granules which appear nonbirefringent when viewed under a polarized microscope. It is characterized more particularly by its high levels of cold-water solubility (at least 50% as measured by the cold-water solubility test described in Example 1 herein).

Where the present starch material is prepared from a chemically unmodified, ungelatinized granular corn starch or an ungelatinized corn starch which has been subjected to a minimal amount of chemical modification, it has the ability when blended with an aqueous sugar syrup to set without cooking or chilling to a resilient, cleanly sliceable gel. The time required for gel formation varies somewhat with starch concentration, the syrup composition, blending conditions and, to some extent, temperature. Applicants have found, however, that when the cold-water-swelling, cold-gelling granular starch material of the present invention is used as the gelling component of a typical flavored pie filling, the blended composition, containing the present starch at the 6% by weight level, sets to a cleanly sliceable gel within 30 minutes at room temperature. The gel-forming property of those present starch materials appears to be independent of pH over the range of pH levels typically found in gelled food formulations.

The characteristic gels formed when the present cold-gelling starch material is dispersed in aqueous sugar syrups are resilient, shape-retaining gels which slice cleanly. They have the texture, but not the clarity, of common gelatin-based gels. A knife or spoon when inserted into a gel of the present starch material and withdrawn therefrom will be substantially free of gel material.

Cold-water solubility as used in characterizing the present cold-water-swelling starch material is determined by mixing a known weight of starch in a measured volume of distilled water with a Waring blender, centrifuging the starch suspension and weighing the residue obtained by evaporation of a measured aliquot of the supernatant liquid. The water solubility of the starch sample is expressed as % solubles, dry substance basis (dsb).

Applicants have seen some correlation between the level of cold-water solubility and the gelling or thickening properties of the present granular starch material. Typically the higher the cold-water solubility value of a preparation of the present cold-water-swelling, cold-gelling granular starch material, the better it performs as a gelling agent in blended dessert formulations. Thus, preferred cold-water-swelling granular starch material of the present invention is characterized by a cold-water solubility of about 70% and above. Most preferred are those exhibiting a cold-water solubility of about 80 to 95%. Viscosity measurements (using a Brookfield viscometer on a Helipath stand) were made on the gels which formed in blended dispersions of 50 grams of a present cold-gelling starch (derived from chemically unmodified, ungelatinized corn starch and having cold-water solubilities ranging from about 80 to 90%) in 200 grams of high fructose corn syrup and 500 ml of water. After allowing the dispersions to stand at 68° F. for 30 minutes, the viscosities ranged from 380,000 to 600,000 centipoise.

The cold-water-swelling granular starch material of the present invention is prepared by forming a slurry of ungelatinized corn starch in an aqueous $C_2$-$C_3$ alkanol and heating that slurry in a confined zone to a temperature of about 300° to 360° F. for about 1 to about 30 minutes before recovering the cold-water-swelling granular starch product from the slurry.

The starch starting material for the process embodiment of the present invention for preparing the present improved cold-water-swelling, cold-water soluble, granular starch is ungelatinized corn starch. The term "ungelatinized corn starch" refers to corn starch which has not been subjected to granule fragmenting processing conditions and which therefore, consists essentially of whole unfragmented granules.

When subjected to the conditions of the present process ungelatinized corn starch, characterized by little or no cold-water solubility, can be converted to a cold-water-swelling nonbirefringent granular starch material which has a cold-water solubility of at least 50%. The ungelatinized corn starch starting material for the present process can be either chemically unmodified, i.e. not reacted with chemical modifiers, or modified chemically by reaction with various amounts of starch reactive chemical reagents such as oxidants, acids, etherifying and esterifying agents. As in the case of cook-up type starch materials, the functional properties of the present starch material varies with the nature and degree of chemical modification of the ungelatinized starch from which the starch material is prepared. The cold-gelling characteristic (i.e. the ability to set to a sliceable gel) of granular starches treated in accordance with the present process is most prominent where the granular starch starting material has been subjected to little or no chemical modification.

In a preferred embodiment of this invention, the ungelatinized starch starting material for this process is chemically unmodified corn starch or corn starch which has been subjected to minimal chemical modification; the cold-water-swelling granular starch products prepared therefrom set to a sliceable gel when blended with an aqueous sugar syrup. Chemically unmodified corn starch has, when treated in accordance with the present process, yielded the best cold-water-swelling starch products in terms of gel times and gel characteristics. Thus, while it is most preferred that an ungelatinized, unmodified corn starch is utilized in the present process to prepare a cold-gelling starch product, chemically modified, ungelatinized corn starch also can be used therein to produce such gelling products, provided that the chemical modification of the ungelatinized corn starch starting material does not interfere with either the cold-water solubilization (i.e., to above about 50%) thereof or with the gelling mechanism of the product cold-water-swelling granular starch material prepared therefrom in accordance with the present process. Accordingly, an ungelatinized corn starch which, for example, has been subjected to mild acid thinning or reacted with relatively low levels (for example, less than about 0.1 molar equivalent) of a starch reactive acetylating agent, when subjected to treatment by the present process, can be expected to provide a product having a cold-water solubility greater than 50% and cold-gelling properties resembling those seen for unmodified corn starch treated under the present conditions.

The effectiveness of the present process for converting an ungelatinized corn starch characterized by little or no cold-water solubility to a cold-water-swelling granular starch material having a cold-water solubility in excess of about 50% is not as dependent on the level of chemical modification of the ungelatinized corn starch starting material as is the gelling characteristics of the starch products. Thus it is possible that chemically modified, ungelatinized corn starch can be subjected to the conditions of the present process to provide a cold-water-swelling granular starch material which exhibits high cold-water solubility but not the unique gelling properties of the chemically unmodified, cold-water-swelling starches in accordance with the present invention. The skilled practitioner will recognize that certain types of chemical modification of the ungelatinized corn starch starting material, particularly reaction with polyfunctional starch reactive cross-linking agents, will render ungelatinized corn starch less susceptible to the water solubilizing effect of the present process. Other types of chemical modification of the ungelatinized corn starch starting material for the present process, for example reaction with oxidants, acid, or esterifying or etherifying agents, will have less of an impact on the ability of the present process conditions to convert the modified ungelatinized corn starch to a cold-water-swelling form thereof having a cold-water solubility in excess of 50%. For example, subjecting an ungelatinized corn starch which has been substituted at the 2 to 3% level by weight of octenyl succinate (using octenyl succinic anhydride) to the conditions of the present process provides a cold-water-swelling granular product having a cold-water solubility of about 80% or above and "instant" thickening characteristics comparable to the thickening characteristics obtained by using the starting octenyl succinate substituted ungelatinized corn starch in cooked food formulations. The product starch does not set to a sliceable gel when blended with an aqueous sugar syrup. Apparently the hydrophobic octenyl succinate groups in that product are present at a level which does not interfere with the capacity of the present process to impart cold-water solubility to the product cold-water-swelling starch; but at the same time those groups interfere with the gelling mechanism which is responsible for the gelling characteristics observed for similarly processed unmodified corn starch.

The process embodiment of the present invention for preparing the present cold-water-swelling granular starch material can be carried out as a batch-type process or as a continuous process. In either instance, the first step in carrying out the process is the preparation of a slurry comprised of about 10 to about 25 parts by weight dry substance basis (dsb) of an ungelatinized corn starch in a liquid medium comprised of about 50 to about 75 parts by weight of an alcohol selected from ethanol, denatured ethanol, propanol and isopropanol and about 13 to about 30 parts by weight of water, provided that the liquid medium for the slurry contains about 15 to about 35% by weight of water inclusive of the water in the starch (i.e., the weight ratio of alcohol to water is about 5.7:1 to 1.9:1). Preferably the slurry is comprised of about 12 to about 20% by weight of starch (dsb) and about 17 to about 30% water.

Flavor and toxicity problems, which may be associated with the use of propanol and/or isopropanol in the processing of food acceptable starch products, are avoided when ethanol is used as the alcohol component of the process slurry. It is noted, however, that from a functional point of view, that is, in terms of producing a granular starch product exhibiting cold-water solubility and gelling characteristics, isopropanol performs as well as ethanol and denatured ethanol.

The aforedescribed slurry of an ungelatinized corn starch in an aqueous alcohol medium is heated to a temperature of about 300° to about 360° F. under autogenic pressure for about 1 to about 30 minutes. The heating process can be conducted as a batch process in a sealed vessel or as a continuous or semi-continuous process by passing the slurry through a heated confined zone at a rate calculated to give a residence time for the slurry in the heated zone of about 1 to about 30 minutes. Preferably the starch slurry is heated to a temperature of about 315° to about 350° F. for a period of about 1 to about 10 minutes to convers the ungelatinized corn starch to the present cold-water-swelling starch having high cold-water solubility. In a most preferred embodiment of the present process, the ungelatinized corn starch slurry contains about 12 to about 20% by weight of starch (dsb) and the liquid medium for the slurry contains about 18 to about 26% by weight of water (i.e., the weight ratio of alcohol to water is about 4.6:1 to 2.8:1); conversion of the ungelatinized corn starch to the present cold-water-swelling/soluble starch is accomplished by heating the slurry to a temperature of about 325° to about 340° F. for a period of about 2 to about 5 minutes.

After the heating step, the slurry is preferably cooled to below about 120° F., and the product cold-water-swelling granular starch is separated from the liquid medium component of the slurry by filtration or centrifugation. Following the recovery of the starch product from the reaction slurry, the starch is typically washed with 1 or more volumes of the alcohol used in the process, and dried and/or desolventized by conventional methods. For example, the starch can be dried in an oven to a certain volatiles level and then contacted with a hot humid gas, preferably moist air or steam, while the starch is maintained at a temperature from about 140° to about 250° F. for a time sufficient to reduce the alcohol content of the starch to a food acceptable level.

It should be noted too that subjecting ungelatinized corn starch to the conditions of the present process reduces the fat content of the granular starch material. Raw or ungelatinized corn starch granules typically contain about 0.4 to about 0.6% by weight native fat. In the improved cold-water-swelling starches of the present invention, the native fat levels are reduced to below about 0.25% and often below about 0.15%.

While applicants can only speculate as to the exact nature of the physicochemical changes which are effected within the granules of granular corn starch treated by the present process, applicants have found no evidence indicative of thermal/chemical degradation (or chemical rearrangement) of the component starch polymers of the present cold-water-swelling, cold-soluble granular starch. The starch polymers in the present granular starch products appear to be essentially unchanged chemically (i.e., same molecular size and same degree of linearity as those in the ungelatinized corn starch starting material for the present process). The high water solubility exhibited by the present starch material appears to be due to a substantial disruption of the hydrogen bonding and other intermolecular forces within the starch granule under the conditions of the present process. The present granular starch material is therefore clearly distinguished from the water-soluble, dextrinized (heat or heat/acid treated) starches disclosed in the literature. See, for example, Whistler and Pashall, *Starch, Chemistry and Technology*, Chapter 11, "Production and Use of Starch Dextrins", Academic Press, Inc., New York, N.Y.

While the cold-water-swelling granular corn starch material of the present invention has application, either alone or in combination with other starch materials, as a thickening agent in both cooked and instant food formulations wherein a starch material is commonly used as the gelling or thickening agent (eg., gravies, sauces, dressings and puddings), the starch material of the present invention having little or no chemical modification is particularly adapted for use in dessert formulations such as pie fillings and custard-type products, as well as demouldable gelled desserts, which products are usually served as cleanly sliceable gels. Such dessert formulations are typically comprised of a blended mixture of water or milk or a combination thereof, a sweetening material (corn syrups, dextrose, sucrose, fructose and the like), flavoring material, coloring material and a gelling agent. When a dessert formulation of that type is prepared utilizing the present cold-water-swelling granular starch material in an amount effective to cause gelation of the dessert formulation, the formulation will set to a resilient cleanly sliceable gel without cooking or chilling. It is preferred that the starch material used as a gelling agent for such dessert formulations be prepared according to the present process from ungelatinized corn starch which has not been reacted with chemical modifiers. It has been found that when the cold-water-swelling, cold-gelling granular starch material utilized in the preparation of such dessert formulations exhibits a cold-water solubility of at least 70%, the dessert formulation sets more quickly and typically to a firmer gel. The time required for such dessert formulations to set depends too on the solids level of the dessert formulation, the temperature of the formulation, and the levels at which the starch gelling agent is employed. Applicants have found that instant gelled dessert formulations utilizing about 5 to about 8% by weight of the present cold-gelling starch and 25-35% total solids will, after blending briefly under conditions of medium to high shear (for example with a kitchen mixer,) typically set at room temperature to a sliceable gel within a period of about 30 to about 60 minutes.

Best results for milk-containing dessert formulations using the present cold-gelling starch material as the gelling agent is obtained by using prior heat-processed milk materials, eg. dry milk solids, sweetened condensed milk and sterile packed whole milk.

Having thus described the various embodiments of the present invention, the following examples are provided to more fully illustrate those embodiments, however, without limiting the invention to specific details of the examples.

EXAMPLE 1

Regular unmodified ungelatinized corn starch was slurried at 20% by weight starch in a 75/25 mixture of denatured ethanol (3A)/water. The slurry was heated under autogenic pressure (in a closed vessel) to 230°, 250°, 270°, 290°, 310° and 330° F. At each temperature (in succession) the slurry was held for 90 seconds, and a sample of the slurry was removed through a cylinder attached to the reactor. Each starch slurry sample was filtered, washed with one slurry volume of ethanol and oven-dried at 120° F. overnight.

The foregoing procedure was repeated substituting methanol and isopropanol for the denatured ethanol. Each of the starch samples was analyzed for residual fat content, cold-water solubility and for loss of birefringence by examination under a polarizing microscope in glycerin or mineral oil.

The determination of the cold-water solubility of the starch samples was carried out by specific procedure involving mixing a starch samples with water in a Waring blender; centrifuging the mixture, evaporating an aliquot of the supernatant liquid and weighing the residue as solubles. The equipment utilized in measuring cold-water solubility is as follows:

(1) Waring blender (Model PB5) equipped with semi-micro monel metal cup (Fisher Scientific Catalog No. 14-509-17);
(2) International Centrifuge Model K or similar;
(3) Centrifuge tubes, 100-ml, and evaporating dish; and
(4) Balance The cold-water solubility measurement is carried out according to the following procedure:

1. Measure exactly 100-ml of distilled water at ambient temperature into the Waring blender cup.
2. Turn the blender on slow speed (about 6100 rpm) and add 1.000 gram of starch sample over less than a 15 second period, then stir for 2 minutes on high speed (about 13,500 rpm).
3. Fill a 100-ml centrifuge tube with the starch solution/suspension and centrifuge at maximum speed (3100 rpm is satisfactory) for 15 minutes.
4. Transfer a 25-ml aliquot of the supernatant to a tared evaporating dish and evaporate on a steam bath to apparent dryness.
5. Dry in an oven at 110° C. for at least 1 hour (overnight is satisfactory) and weigh.

Cold-water solubility, expressed as percent water solubles (dsb), is then calculated according to the following formula:

$$\% \text{ water solubles (dsb)} = \frac{(\text{wt. of solids in 25 ml}) \times 4}{(\text{wt. of sample}) \times \frac{(100\% \text{ Moisture})}{100}} \times 100$$

The results of the product starch analyses are presented in Table I.

TABLE I

| Aqueous Solvent | Reaction Temp. (°F.) | Hydrolyzed Fat (%) | Cold-Water Solubility (%) | % Birefringence |
|---|---|---|---|---|
| Ethanol | 230 | .144 | .45 | 39 |
| " | 250 | .077 | .98 | 38 |
| " | 270 | .076 | 1.65 | 30 |
| " | 290 | .082 | 9.24 | 5 |
| " | 310 | .075 | 60.4 | ) |
| " | 330 | .048 | 87.2 | ) |
| Methanol | 230 | .095 | .83 | 39 |
| " | 250 | .088 | .82 | 39 |
| " | 270 | .329 | 1.34 | 35 |
| " | 290 | .397 | 4.52 | 10 |
| " | 310 | .352 | 5.95 | 10 |
| " | 330 | .173 | 7.69 | 5 |
| Isopropanol | 230 | .139 | .58 | 98 |
| " | 250 | .074 | 1.74 | 95 |
| " | 270 | .057 | 5.08 | 90 |
| " | 290 | .044 | 50.8 | ) |
| " | 310 | .034 | 72.6 | ) |
| " | 330 | .036 | 86.8 | 0 |

The data in Table I illustrate both the differences between the effectiveness of aqueous methanol versus aqueous ethanol and isopropanol for developing cold-water solubility in the processed starch and the need for a process temperature of at least about 300° F. (290° F. in case of isopropanol).

EXAMPLE 2

A slurry of 5,700 grams (5,000 grams, dsb) of regular ungelatinized corn starch in 15,750 grams of 3A ethanol and 4,314 grams of water was pumped through a laboratory shell and tube reactor heated to 335° F. at such a rate to provide a residence time for the slurry of about 3 minutes in the heated zone. The pressure in the system ranged from about 400 to about 600 psig. Before the processed slurry was removed from the system, it was cooled below 100° F. in a cooling heat exchanger connected in series with the heated laboratory shell and tube reactor. The effluent slurry was divided into three portions. Portion 1 was centrifuged within 30 minutes of processing, and the starch product was washed with one gallon of ethanol and dried. A second portion was held at room temperature for about 3 hours before the starch product was centrifuged from the slurry, washed with one gallon of ethanol and dried. The third portion was held at room temperature for 5 days before the starch product was centrifuged from the slurry and thereafter washed with one gallon of ethanol and dried. The starch products from those product slurries are designated Samples 1, 2 and 3 respectively in Table II.

The entire process was repeated using methanol in place of denatured ethanol (Samples 4, 5 and 6). Each of the starch samples was evaluated for fat content and cold-water solubility. The results of those analyses are presented in Table II.

TABLE II

| Sample No. | Aqueous Alcohol | Time Held After Processing | % Fat (dsb) | % Cold-Water Solubility (dsb) |
|---|---|---|---|---|
| 1 | Ethanol | 0.5 (hr.) | .025 | 84.5 |
| 2 | " | 3 | .006 | 91.1 |
| 3 | " | 120 | .061 | 85.1 |
| 4 | Methanol | 0.5 | .163 | 36.6 |
| 5 | " | 3 | .144 | 18.0 |
| 6 | " | 120 | .082 | 5.6 |
| Starting Starch | | | .407 | 0.13 |

Each of the six starch samples were also evaluated for their viscosity and gel characteristics in aqueous sugar solutions comparable to high moisture pie filling formulations. The functional evaluations of the starch samples were carried out by first mixing 50 grams of the starch sample in 200 grams of high fructose corn syrup (at about 76% solids d.s.b., 55% fructose). To the liquid concentrate thereby prepared was added 500-ml. of chilled water. The mixture was thoroughly blended and poured into dessert cups. After 30 minutes at 68° F., each of the mixtures prepared using the denatured ethanol process starch samples set to firm demouldable gels while each of the compositions prepared from the methanol process starch samples were thick but pourable and evidenced to gel formation.

The viscosity of each of the prepared starch/HFCS syrup compositions was measured using a RVT Brookfield Viscometer on a Model C Helipath Stand after 30 minutes, 2 hours and 20 hours at room temperature. The results are listed in Table III below.

TABLE III

| | Results of Viscosity Measurements | | | |
|---|---|---|---|---|
| Sample | Alcohol | 30 min. | 2 Hr. | 20 Hr. |
| 1 | 3A ethanol | 600,000 cps | 600,000 | 530,000 |
| 2 | " | 500,000 | 530,000 | 450,000 |
| 3 | " | 420,000 | 380,000 | 380,000 |
| 4 | Methanol | 56,000 | 150,000 | 170,000 |
| 5 | " | 48,000 | 80,000 | 100,000 |
| 6 | " | 32,000 | 50,000 | 100,000 |

EXAMPLE 3

A series of 12 experiments were run to explore the effects of the variables of starch concentration, alcohol/water ratios, temperature and time. The dependent variable was cold-water solubility.

The reaction components in each experiment were unmodified, ungelatinized corn starch, 3A ethanol and water. The amounts of each used in each experiment are reported in Table IV as fractions of the total mass of the reaction slurry. The starch is reported on a dry substance basis (dsb), the alcohol as anhydrous 3A ethanol, and the water inclusive of the bound water in the starch. Starch concentrations range from 13.1 to 21.9%, 3A ethanol from 52 to 78.4% and water from 2.5 to 29.9%.

Each mixture of starch, water, and 3A ethanol was charged to a sealed, stirred reactor and heated under autogenic pressure to temperatures ranging from 250° to 350° F. Samples of the reaction slurry were taken through a cylinder attached to the reactor after a specified hold time at temperature. Each slurry sample was filtered, washed with two volumes of 3A ethanol, dried and thereafter analyzed for cold-water solubility (dsb) in accordance with the procedure described in Example 1 above.

The results from the experiments are presented in Table IV.

TABLE IV

| Reaction Starch | Slurry Alcohol | Composition Water | Time (min) at Temp. | Cold-Water Solubility, % (dsb) | | | | | |
|---|---|---|---|---|---|---|---|---|---|
| | | | | 350 | 330 | 310 | 290 | 270 | 250 |
| .181 | .680 | .139 | 1 | 52.9* | 4.2 | 1.7 | .7 | .7 | — |
| .181 | .600 | .219 | 1 | — | 80 | 73.1* | 27 | 1.0 | 1.3 |
| .181 | .520 | .299 | 1 | — | 39.7 | 42.5 | 8.0 | 6.7 | 3.6 |
| .131 | .580 | .289 | 1 | — | 82.4 | 61.4* | 34 | 1.1 | 1.8 |
| .219 | .581 | .200 | 1 | — | 60.1* | 51.2* | 32* | 2.0 | 2.0 |
| .191 | .784 | .025 | 5 | 2.0 | | | | | |
| .191 | .735 | .074 | 5 | 3.0 | | | | | |
| .191 | .686 | .123 | 5 | 15.0 | | | | | |
| .191 | .637 | .172 | 5 | 83 | | | | | |
| .191 | .588 | .221 | 5 | 90 | | | | | |
| .191 | .647 | .162 | 5 | 61.1 | | | | | |
| .193 | .626 | .181 | 5 | 82 | | | | | |

*Average of two values

EXAMPLE 4

A starch slurry was prepared by adding 10 pounds of food grade, ungelatinized, unmodified corn starch to a mixture of 31.5 pounds (4.76 gallons) of anhydrous 3A ethanol and sufficient water to adjust the moisture content of the liquid to 21 to 22% as determined by a Karl Fischer analysis. The starch slurry was pumped through a shell and tube reactor heated to 335° to 340° F. (outlet pressure 325 psig) at a rate appropriate to give a total residence time in the heated reactor of about 1.8 minutes. The starch slurry was then passed through a cooling heat exchanger connected in series with the shell and tube reactor; the slurry was cooled to below 90° F. in the heat exchanger. The slurry was collected in a centrifuge feed tank and then centrifuged and washed with 3A ethanol. The starch product was then dried at about 250° F. to a maximum moisture and volatiles level of about 4% and then desolventized by heating the starting to about 200° F. in a fluidized bed in the presence of moist air, until the ethanol level is reduced to below 0.5%. Cold-water-swelling starch products prepared in accordance with the foregoing procedure typically exhibit cold-water solubilities ranging from about 75 to about 90 and all set to a resilient sliceable gel, without cooking or chilling, when blended with an aqueous sugar syrup.

The following viscosity measurement was made on a starch product having a cold-water solubility of about 85% prepared by the above procedure. Using a Servodyne strirring unit set at 1500 rpm with a hoop stirrer, 26.7 grams (25 grams, dsb) of the starch product were added to 223.3 grams of water in a 600-ml beaker at 75° F. while stirring at 1500 rpm. After stirring 2 minutes, the starch paste was quickly transferred to a 200-ml beaker and the viscosity was measured with a RVT Brookfield viscometer using spindle 6 at 20 rpm. The measured viscosity was 44,500 centipoise.

EXAMPLE V

The same procedure was followed as in Example 4 except octenylsuccinate substituted (1.7–3.0% by weight octenylsuccinate, dsb) ungelatinized corn starch was substituted for the unmodified granular corn starch used in Example 4. The nonbirefringent granular product exhibited a cold-water solubility of 84%, dsb.

EXAMPLE 6

A lemon dessert filling was prepared from the following ingredients:
150 grams high fructose corn syrup (76% ds, 55% fructose)
4 cc of 50% citric acid
0.5 cc lemon oil
50 grams of starch product from Example 4
0.1 gram yellow #5 color
500 cc of cold water
100 grams granulated sugar Procedure and Results:

Into a blended mixture of the corn syrup, citric acid and lemon oil in a 2 quart mixing bowl was blended the starch and yellow color to form a smooth concentrate. To that concentrate was added 1 pint of cold water, pouring and mixing quickly with an electric kitchen mixer and scraping the sides of the bowl with a rubber spatula to ensure uniform mixing and consistency (mixing time approximately 3 minutes). The granulated sugar was then added to the composition and mixing completed. The finished liquid was then poured into a pie shell, dessert cups and jello moulds and allowed to stand at room temperature for about 30 minutes. After that time the pie was ready for slicing and the jelled composition could be removed from the dessert cups or jello moulds as a shape retaining, resilient cleanly sliceable gel ready for serving. The gelled lemon dessert composition was found to have a texture, flavor and mouth-feel comparable to that of cooked starch-based lemon dessert preparations.

We claim:

1. An improved cold-water-swelling granular starch material derived from ungelatinized corn starch consisting essentially of substantially intact, partially swollen granules which appear nonbirefringent when viewed under a polarizing microscope and which have a cold-water-solubility of at least 50% and a reduced native fat content of about 0.25% or less.

2. The improved cold-water-swelling granular starch material of claim 1 characterized by a cold-water solubility of at least 70%.

3. The improved cold-water-swelling granular starch of claim 2 characterized by a reduced native fat content of about 0.15% or less.

4. The improved cold-water-swelling granular starch of claim 1 characterized further by an ability to set, without cooking or chilling, to a resilient, sliceable gel when blended with an aqueous sugar syrup.

5. The improved cold-water-swelling granular starch of claim 4 derived from ungelatinized corn starch which has not been chemically modified.

6. The improved cold-water-swelling granular starch material of claim 4 characterized by a cold-water solubility of at least 70%.

7. The improved cold-water-swelling granular starch of claim 4 which has not been chemically modified and which has a cold-water solubility of about 80 to about 95% and a reduced native fat content of about 0.15% or less.

8. A process for preparing the improved cold-water-swelling granular starch material of claim 4 which comprises:
(1) preparing a starch slurry comprised of about 10 to about 25 parts by weight (dsb) of ungelatinized corn starch in a liquid medium comprised of about 50 to about 75 parts by weight of an alcohol selected from ethanol, denatured ethanol, propanol and isopropanol and about 13 to about 30 parts per weight of water provided that the liquid medium contains about 15 to about 35% by weight of water inclusive of the water in the starch, said ungelatinized corn starch being characterized by little or no chemical modification;
(2) (a) heating said starch slurry in a closed vessel to a temperature of about 300° to about 360° F. for about 1 to about 30 minutes; or
(b) passing said slurry through a heated confined zone in which the slurry is heated from about 300° to about 360° F., the rate of flow of the slurry through said confined zone being such that the residence time for said slurry in the confined zone is about 1 to about 30 minutes; and
(3) recovering the cold-water-swelling granular starch from the slurry.

9. The process of claim 8 wherein the alcohol is ethanol or denatured ethanol.

10. The process of claim 8 wherein the alcohol is isopropanol.

11. The process of claim 8 wherein the starch slurry contains about 12 to about 20% by weight of starch.

12. The process of claim 11 wherein the liquid medium for the slurry contains about 18 to about 26% by weight water.

13. The process of claim 12 wherein the starch slurry is heated to a temperature of about 315° to about 350° F. for a period of about 1 to about 10 minutes.

14. The process of claim 13 wherein the alcohol used in forming the starch slurry is ethanol or denatured ethanol.

15. The process of claim 14 wherein the slurry is heated to a temperature of about 325° to about 340° F. for a period of about 2 to about 5 minutes and then cooled to below about 120° F. prior to recovering the cold-water-swelling granular starch from the slurry.

16. A process for converting an ungelatinized corn starch characterized by little or no cold-water solubility to a cold-water-swelling granular material consisting essentially of substantially intact, partially swollen granules which appear nonbirefringent when viewed under a polarizing microscope said cold-water-swelling granular starch material being further characterized by a cold-water solubility of at least 50%, which process comprises:

(1) preparing a starch slurry comprised of about 10 to about 25 parts by weight (dsb) of an ungelatinized corn starch in a liquid medium comprised of about 50 to about 75 parts by weight of an alcohol selected from ethanol, denatured ethanol, propanol and isopropanol and about 13 to about 30 parts by weight of water provided that the liquid medium contains about 15 to about 35% by weight of water inclusive of the water in the starch;

(2) (a) heating said starch slurry in a closed vessel to a temperature of about 300° to about 360° F. for about 1 to about 30 minutes; or
   (b) passing said slurry through a heated confined zone in which the slurry is heated from about 300° to about 360° F., the rate of flow of the slurry through said confined zone being such that the residence time for said slurry in the heated confined zone is about 1 to about 30 minutes; and (3) recovering the cold-water-swelling granular starch from the slurry.

17. The process of claim 16 wherein the alcohol is ethanol or denatured ethanol.

18. The process of claim 16 wherein the alcohol is isopropanol.

19. The process of claim 16 wherein the starch slurry contains about 12 to about 20% by weight of starch and the liquid medium for the slurry contains about 18 to about 26% by weight water.

20. The process of claim 19 wherein the starch slurry is heated to a temperature of about 315° to about 350° F. for a period of about 1 to about 10 minutes.

21. The process of claim 20 wherein the alcohol is used in forming the starch slurry is ethanol or denatured ethanol.

22. The process of claim 21 wherein the slurry is heated to a temperature of about 325° to about 340° F. for a period of about 2 to about 5 minutes.

23. In an instant no-cook food composition wherein a starch material is used as the thickening agent, the improvement comprising the cold-water-swelling granular corn starch material of claim 1.

24. In an instant no-cook food composition wherein a starch material is used as the gelling or thickening agent, the improvement comprising the cold-water-swelling granular corn starch material of claim 4.

25. The improved instant food composition of claim 24 wherein the starch gelling or thickening agent is a cold-water-swelling granular corn starch material derived from ungelatinized corn starch which has not been chemically modified.

26. The improved instant food composition of claim 24 wherein the starch gelling or thickening agent exhibits a cold-water solubility of at least 70%.

27. A dessert formulation which will set to a resilient cleanly sliceable gel without cooking or chilling comprising a blended mixture of water or milk or a combination thereof, sweetening material, flavoring material, coloring material and the cold-water-swelling granular starch material of claim 4 in an amount effective to cause gelation of the dessert formulation.

28. The dessert formulation of claim 27 wherein the cold-water-swelling granular starch is (1) derived from ungelatinized corn starch which has not been reacted with chemical modifiers; (2) characterized by a cold-water solubility of at least about 70%, and (3) characterized further by a reduced native fat content of about 0.15% or less.

29. A dessert formulation of claim 27 wherein the cold-water-swelling granular starch material constitutes about 5 to about 8% by weight of the dessert formulation.

* * * * *